United States Patent
Susca et al.

(10) Patent No.: US 11,725,647 B2
(45) Date of Patent: Aug. 15, 2023

(54) ON-DEMAND DUAL VARIABLE DISPLACEMENT POSITIVE DISPLACEMENT PUMPING SYSTEM

(71) Applicant: Hamilton Sundstrand Corporation, Charlotte, NC (US)

(72) Inventors: Ryan Susca, Windsor, CT (US); Morgan O'Rorke, West Hartford, CT (US); Matej Rutar, Manchester, CT (US); Todd Haugsjaahabink, Springfield, MA (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 80 days.

(21) Appl. No.: 17/324,017

(22) Filed: May 18, 2021

(65) Prior Publication Data
US 2022/0372967 A1    Nov. 24, 2022

(51) Int. Cl.
*F04B 49/00* (2006.01)
*F02C 7/236* (2006.01)
(Continued)

(52) U.S. Cl.
CPC .......... *F04B 49/002* (2013.01); *F02C 7/236* (2013.01); *F04B 1/295* (2013.01); *F04B 1/324* (2013.01); *F04B 23/06* (2013.01); *F04B 1/146* (2013.01)

(58) Field of Classification Search
CPC ........ F04B 49/002; F04B 23/00; F04B 23/06; F04B 1/146; F04B 1/295; F04B 1/324; F02C 7/236
(Continued)

(56) References Cited

U.S. PATENT DOCUMENTS 4,405,287 A * 9/1983 Kuchenbecker ...... F04B 49/002
60/447
4,880,359 A * 11/1989 Hoffmeister .......... F16H 61/433
60/421
(Continued)

FOREIGN PATENT DOCUMENTS

| DE | 42 08 925 | * | 3/1993 |
| JP | H0882287 A | | 3/1996 |
| JP | H0882288 A | | 3/1996 |

OTHER PUBLICATIONS

Partial European Search Report for EP Application No. 22174114.3, dated Sep. 26, 2022, 14 pages.
(Continued)

*Primary Examiner* — Charles G Freay
(74) *Attorney, Agent, or Firm* — Kinney & Lange, P.A.

(57) ABSTRACT

A pumping system includes a first variable displacement pump having a first inlet and a first outlet. The first outlet is fluidically connected to a system outlet. A first actuator is mechanically coupled to a first displacement mechanism of the first variable displacement pump A second variable displacement pump includes a second inlet and a second outlet. The second outlet is fluidically connected to the system outlet. The pumping system also includes a second actuator mechanically coupled to a second displacement mechanism of the second variable displacement pump. An electrohydraulic servo valve is hydraulically connected to the first and second actuators. An electronic engine controller is in communication with the electrohydraulic servo valve and is configured to send electrical current to the electrohydraulic servo valve to drive the first actuator and the second actuator.

19 Claims, 3 Drawing Sheets

(51) Int. Cl.
  *F04B 1/295* (2020.01)
  *F04B 23/06* (2006.01)
  *F04B 1/324* (2020.01)
  *F04B 1/146* (2020.01)

(58) Field of Classification Search
  USPC .......................................................... 417/216
  See application file for complete search history.

(56) References Cited

U.S. PATENT DOCUMENTS

| | | | |
|---|---|---|---|
| 5,913,663 A * | 6/1999 | Erkkilae | ............... F04B 49/065 |
| | | | 60/443 |
| 6,102,001 A | 8/2000 | Mclevige | |
| 6,487,847 B1 | 12/2002 | Snow et al. | |
| 8,128,377 B2 | 3/2012 | Earhart et al. | |
| 10,526,973 B2 | 1/2020 | Waissi et al. | |
| 2003/0144818 A1* | 7/2003 | Kasuya | ................. F04B 49/002 |
| | | | 702/185 |
| 2015/0276088 A1* | 10/2015 | Rutar | ......................... F16K 3/24 |
| | | | 137/625.69 |
| 2017/0009753 A1 | 1/2017 | Pfaff et al. | |
| 2018/0372323 A1 | 12/2018 | Griffiths | |

OTHER PUBLICATIONS

Extended European Search Report for European Application No. 22174114.3, dated Jan. 18, 2023, pp. 13.

\* cited by examiner

ON-DEMAND DUAL VARIABLE DISPLACEMENT POSITIVE DISPLACEMENT PUMPING SYSTEM

BACKGROUND

The present disclosure relates to a pumping system, and in particular to a pumping system with multiple pumps.

Pumping systems supply fuel to an engine of a vehicle. For example, pumping systems can supply fuel to a jet turbine engine of an aircraft or an engine of an automobile. An improved pumping system is disclosed hereafter.

SUMMARY

In one example, a pumping system includes a first variable displacement pump having a first inlet and a first outlet. The first outlet is fluidically connected to a system outlet. A first actuator is mechanically coupled to a first displacement mechanism of the first variable displacement pump. A second variable displacement pump includes a second inlet and a second outlet. The second outlet is fluidically connected to the system outlet. The pumping system also includes a second actuator mechanically coupled to a second displacement mechanism of the second variable displacement pump. An electrohydraulic servo valve is hydraulically connected to the first and second actuators. An electronic engine controller is in communication with the electrohydraulic servo valve and is configured to send electrical current to the electrohydraulic servo valve to drive the first actuator and the second actuator.

In another example, a fuel delivery system includes a fuel line connected to a fuel nozzle. A first pump assembly has a first pump with a first outlet fluidically connected to the fuel line. A first hydraulic actuator is mechanically coupled to the first pump, and a first linear variable differential transducer is attached to the first hydraulic actuator. A first check valve is downstream from the first pump. The first check valve prevents backflow into the first pumping assembly. A second pump assembly includes a second pump with a second outlet fluidically connected to the fuel line. A second hydraulic actuator is mechanically coupled to the second pump, and a second linear variable differential transducer is attached to the second hydraulic actuator. A second check valve is downstream from the second pump. The second check valve prevents backflow into the second pumping assembly. The fuel delivery system also includes an electrohydraulic servo valve hydraulically connected to the first and second hydraulic actuators. An electronic engine controller is in communication with the first linear variable differential transducer, the second linear variable differential transducer, and the electrohydraulic servo valve.

In another example, a method of controlling a pumping system includes sensing by a first position sensor a linear displacement of a first actuator that is mechanically coupled to a displacement mechanism of a first variable displacement pump. A second position sensor senses a second linear displacement of a second actuator that is mechanically coupled to a second displacement mechanism of a second variable displacement pump. The method also includes receiving the linear displacement of the first actuator and the second linear displacement of the second actuator by an electronic engine controller. The electronic engine controller sends a current to a servo valve. The servo valve is hydraulically connected to the first actuator and the second actuator. The servo valve communicates hydraulically with at least one of the first and second actuators in response to the current sent to the servo valve.

While the above-identified figures set forth one or more embodiments of the present disclosure, other embodiments are also contemplated, as noted in the discussion. In all cases, this disclosure presents embodiments by way of representation and not limitation. It should be understood that numerous other modifications and embodiments can be devised by those skilled in the art, which fall within the scope and spirit of the principles of the disclosure. The figures may not be drawn to scale, and applications and embodiments of the present disclosure may include features and components not specifically shown in the drawings.

DETAILED DESCRIPTION

The pumping system includes a first pump, a second pump, a first actuator, a second actuator, an electrohydraulic servo valve, and an electronic engine controller. The first actuator is attached to a first displacement mechanism of the first pump. The second actuator is attached to a second displacement mechanism of the second pump. The electrohydraulic servo valve is hydraulically connected to the first actuator and the second actuator. The electronic engine controller communicates with the electrohydraulic servo valve and sends electrical current to the electrohydraulic servo valve. In response to the electrical current sent by the electronic engine controller, the electrohydraulic servo valve sends hydraulic fluid to the first and second actuators to drive the first and second actuators and engage the displacement mechanisms of the first and second pumps. The pumping system will be discussed with reference to FIGS. 1-3.

Figure 1:
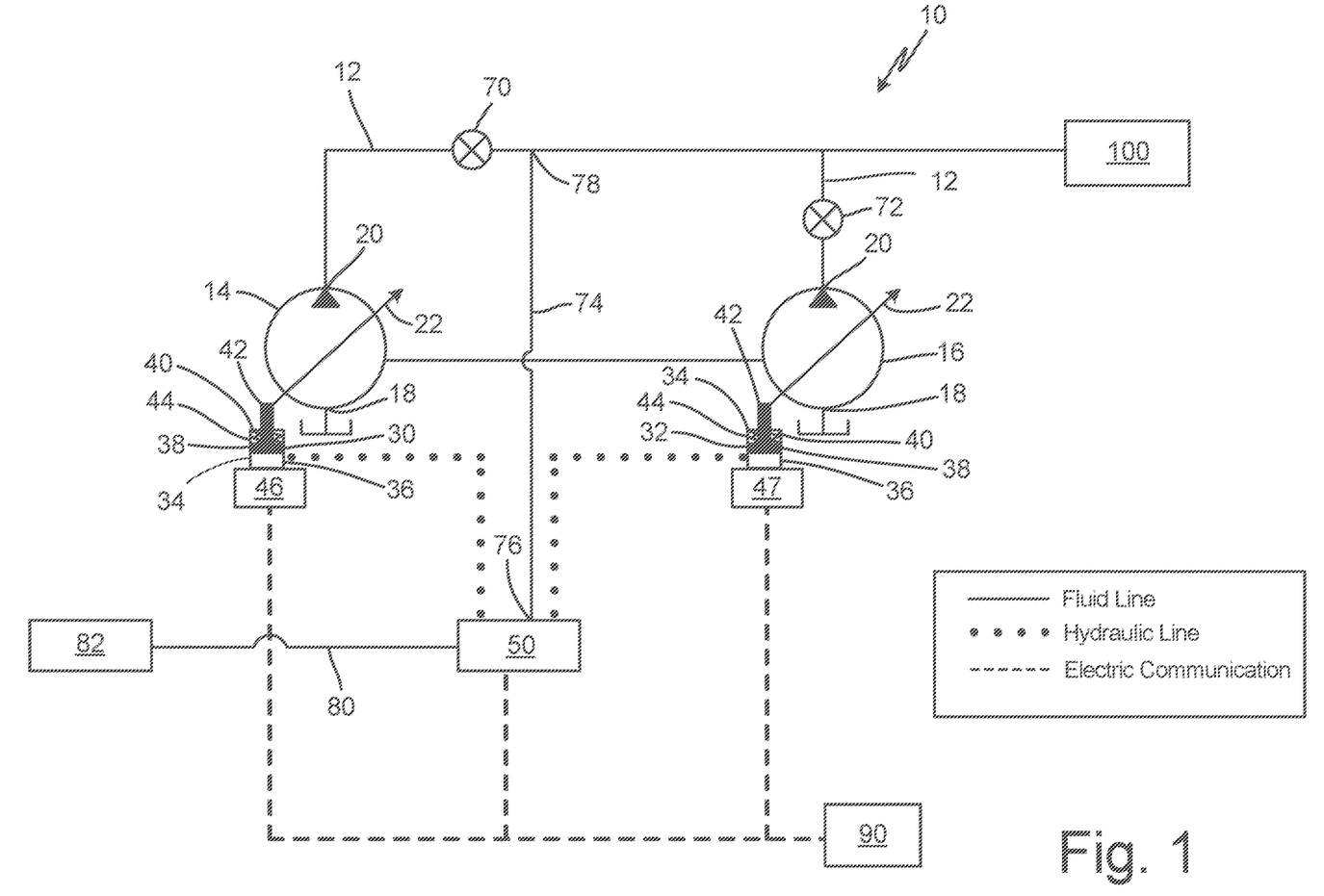
FIG. 1 is a schematic diagram of a pumping system.

FIG. 1 is a schematic diagram of pumping system 10. Pumping system 10 includes fuel line 12, first pump 14, second pump 16, first actuator 30, second actuator 32, servo valve 50, first check valve 70, second check valve 72, first hydraulic pressure line 74, second hydraulic pressure line 80, fluid supply 82, electronic engine controller 90, and system outlet 100. First pump 14 and second pump 16 are variable displacement pumps. First pump 14 and second pump 16 both include inlet 18, outlet 20, and displacement mechanism 22. First actuator 30 and second actuator 32 are each piston assemblies. Each of first and second actuators 30 and 32 includes housing 34, fluid chamber 36, piston cylinder 38, spring chamber 40, piston rod 42, spring 44, and linear variable differential transducer 46. First hydraulic pressure line 74 includes first end 76 and second end 78.

Outlet 20 of first pump 14 and outlet 20 of second pump 16 are fluidically connected to system outlet 100 by fuel line 12. In one example, system outlet 100 can be a fuel nozzle or fuel injector for a combustion section in a gas turbine engine. In another example, system outlet 100 can be any other combustion mechanism of an engine. Displacement mechanism 22 of first pump 14 is mechanically coupled to first actuator 30. Displacement mechanism 22 of second pump 16 is mechanically coupled to second actuator 32. In one example, displacement mechanism 22 for each of first and second pumps 14 and 16 can be a swashplate. In another example, displacement mechanism 22 can be any other displacement mechanism used in variable displacement pumps. Servo valve 50 is hydraulically connected to first and second actuators 30 and 32. Electronic engine controller 90 is in electrical communication with servo valve 50. Electronic engine controller 90 is configured to send electrical current to servo valve 50 to drive first and second actuators 30 and 32.

First and second actuators 30 and 32 have a similar configuration. In each of first and second actuators 30 and 32, fluid chamber 36 is contained within housing 34. Piston cylinder 38 is inside housing 34. Spring chamber 40 is inside housing 34 opposite fluid chamber 36 relative to piston cylinder 38. Piston rod 42 is attached to piston cylinder 38. Spring 44 is compressed in spring chamber 40 between housing 34 and piston cylinder 38. Piston rod 42 of first actuator 30 is mechanically connected to displacement mechanism 22 of first pump 14. Piston rod 42 of second actuator 32 is mechanically connected to displacement mechanism 22 of second pump 16. Linear variable differential transducer 46 of first actuator 30 is in communication with electronic engine controller 90. Linear variable differential transducer 47 of second actuator 32 is also in communication with electronic engine controller 90. Linear variable differential transducer 46 and 47 for each of first actuator 30 and second actuator 32 can be electrically wired to electronic engine controller 90, or can communicate wirelessly with electronic engine controller 90. Linear variable differential transducer 46 of first actuator 30 is a first position sensor that is configured to measure a linear displacement of first actuator 30. Linear variable differential transducer 47 of second actuator 32 is a second position sensor that is configured to measure a linear displacement of second actuator 32. Electronic engine controller 90 receives the linear displacement of first and second actuators 30 and 32 from linear variable differential transducers 46 and 47 of first and second actuators 30 and 32. Electronic engine controller 90 uses the linear displacement measurements from linear variable differential transducers 46 and 47 of first and second actuators 30 and 32 to calculate a position for displacement mechanism 22 for each of first pump 14 and second pump 16. By calculating the position for displacement mechanism 22 for each of first pump 14 and second pump 16, electronic engine controller 90 can determine a flowrate for each of first pump 14 and second pump 16.

Fuel line 12 contains first check valve 70 and second check valve 72. First check valve 70 is downstream from outlet 20 of first pump 14 and is fluidically between outlet 20 of first pump 14 and system outlet 100. First check valve 70 prevents backflow into first pump 14. Second check valve 72 is downstream from outlet 20 of second pump 16 and is fluidically between outlet 20 of second pump 16 and system outlet 100. Second check valve 72 prevents backflow into second pump 16. First end 76 of first hydraulic pressure line 74 is fluidically connected to servo valve 50. Second end 78 of hydraulic pressure line 74 is fluidically connected to fuel line 12 between system outlet 100 and first and second check valves (70 and 72). Servo valve 50 can use first pressure line 74 to selectively deliver fuel and pressure from fuel line 12 to fluid chamber 36 of each of first actuator 30 and second actuator 32 to fill fluid chamber 36 and extend piston rod 42. Second hydraulic pressure line 80 fluidically connects servo valve 50 to fluid supply 82. Fluid supply 82 can be a fuel reservoir that is connected to inlet 18 of first pump 14, a fuel reservoir that is connected to inlet 18 of second pump 16, or a reservoir that is connected to both inlet 18 of first pump 14 and inlet 18 of second pump 16. Fluid supply 82 can be a fluid reservoir that is not fluidically connected to inlet 18 of first pump 14, or inlet 18 of second pump 16. Servo valve 50 can use second pressure line 80 to selectively remove pressure and fuel from fluid chamber 36 of each of first actuator 30 and second actuator 32 and allow spring 40 to move piston cylinder 38 and retract piston rod 42 into housing 34. As piston rod 42 is extended and retracted, the respective displacement mechanism 22 connected to piston rod 42 is moved, which increases or decreases the flow rate of first pump 14 and/or second pump 16.

Figure 2:
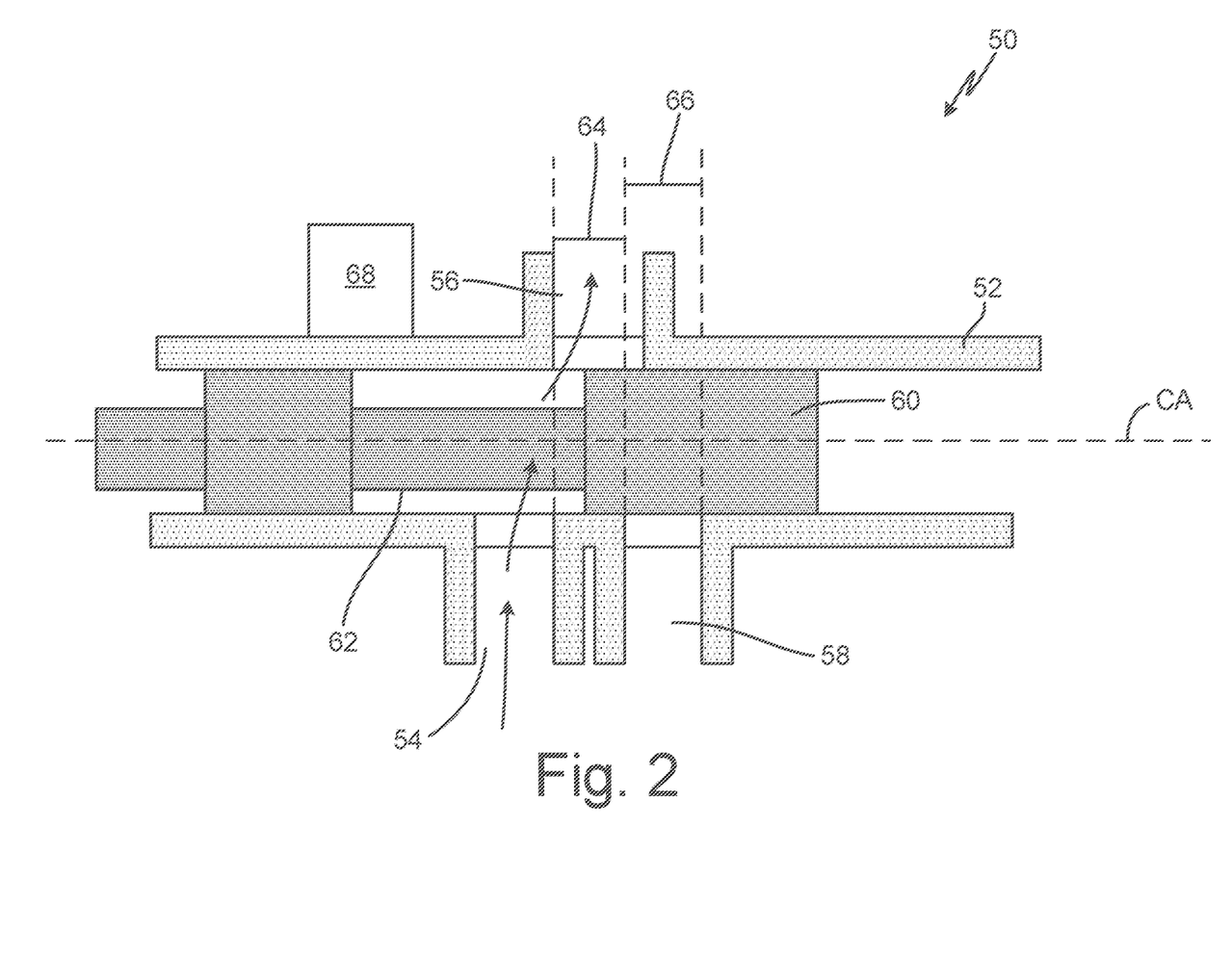
FIG. 2 is a schematic diagram of a servo valve supplying a hydraulic fluid to a first outlet.
Figure 3:
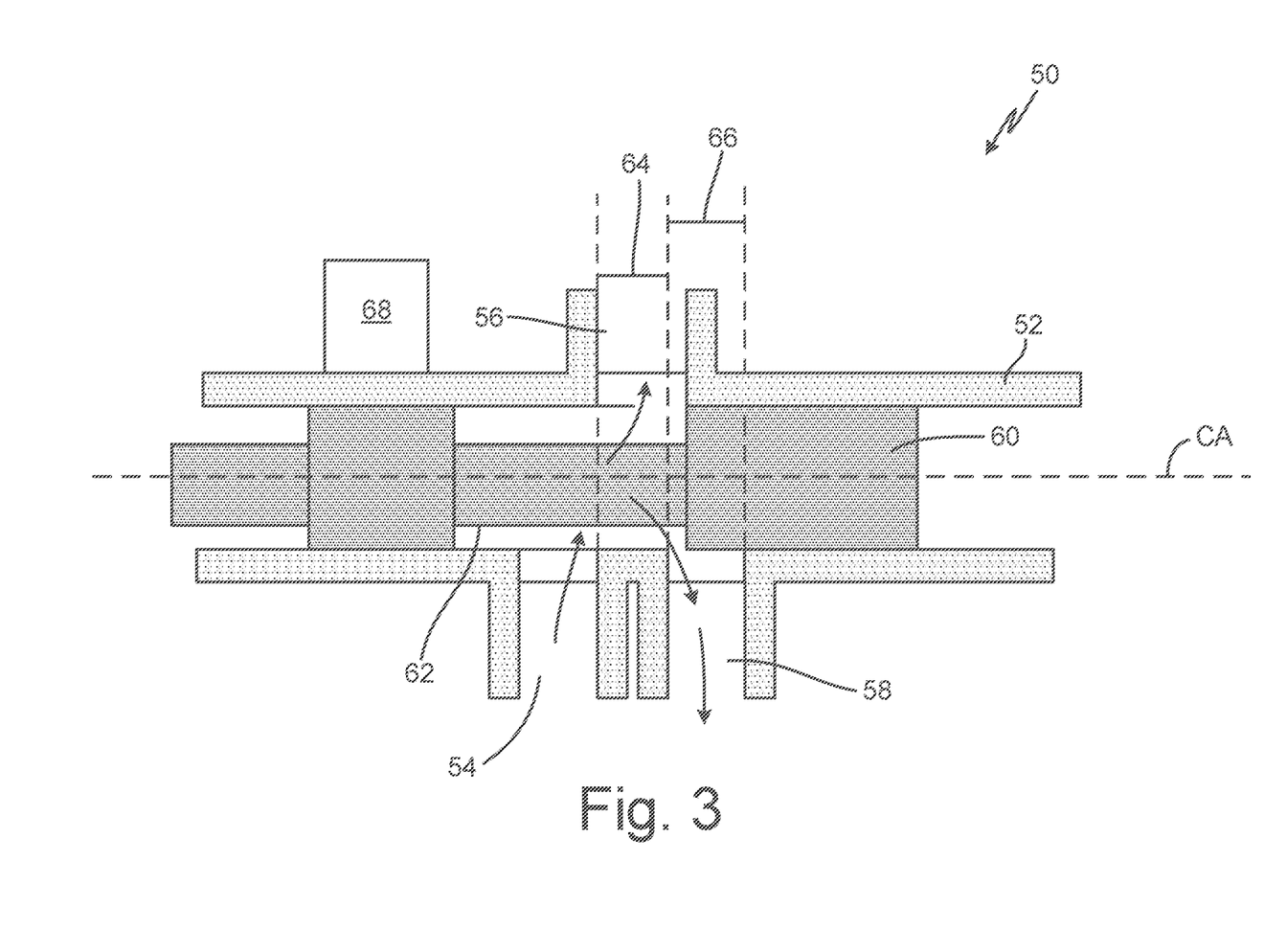
FIG. 3 is another schematic diagram of the servo valve from FIG. 2 supplying the hydraulic fluid to the first outlet and a second outlet.

FIGS. 2 and 3 will be discussed concurrently. FIG. 2. is a schematic diagram of servo valve 50 supplying hydraulic fluid to first outlet port 56. FIG. 3 is a schematic diagram of servo valve 50 supplying hydraulic fluid to first outlet port 56 and second outlet port 58. Servo valve 50 is an electrohydraulic servo valve. Servo valve 50 includes sleeve 52, inlet port 54, first outlet port 56, second outlet port 58, spool 60, center axis CA, and motor 68. Spool 60 includes chamber 62, first position range 64, and second position range 66.

Sleeve 52 is generally tubular with a cylindrical interior passage sized for receiving spool 60. Inlet port 54 is formed on sleeve 52 and extends through sleeve 52. Inlet port 54 fluidically communicates with chamber 62 of spool 60 both when spool 60 is in first position range 64 and when spool 60 is in second position range 66. First outlet port 56 is formed on sleeve 52 and is hydraulically connected to first actuator 30. Second outlet port 58 is formed on sleeve 52 and is staggered with first outlet port 56 such that an axial position of first outlet port 56 overlaps an axial position of second outlet port 58 relative center axis CA of sleeve 52.

Spool 60 is inside of the interior passage of sleeve 52. Chamber 62 is formed on spool 60. First hydraulic pressure line 74 fluidically connects inlet port 54 of servo valve 50 to fuel line 12. Chamber 62 is sized to fill with fuel from fuel line 12 and inlet port 54 and distribute fuel to first and second outlet ports 56 and 58 depending on the position of spool 60.

Motor 68 is configured to position spool 60 within sleeve 52. More specifically, motor 68 positions chamber 62 and spool 60 within first position range 64 when electronic engine controller 90 applies a first current range to motor 68. First position range 64 is a position of spool 60 and chamber 62 within sleeve 52 where second outlet port 58 is completely closed and first outlet port 56 is at least partially open to chamber 62 and inlet port 54. Motor 68 is configured to position spool 60 within second position range 66 when electronic engine controller 90 applies a second current range to motor 68. Second position range 66 is another position of chamber 62 and spool 60 within sleeve 52. When chamber 62 is in second position range 66, second outlet port 58 is at least partially open to chamber 62 and inlet port 54. A majority of first outlet port 56 is open to chamber 62 and inlet port 54 when chamber 62 is within second position range 66.

In operation, linear variable differential transducer 46 of first actuator 30 senses a linear displacement of first actuator 30. Linear variable differential transducer 47 of second actuator 32 senses a linear displacement of second actuator 32. Electronic engine controller 90 is electrically connected to linear variable differential transducers 46 and 47 of first and second actuators 30 and 32. Electronic engine controller 90 receives the linear displacement of first and second actuators 30 and 32. In response to the linear displacement of first and second actuators 30 and 32, electronic engine controller 90 sends an electrical current to servo valve 50. In response to the electrical current, servo valve 50 hydraulically communicates with first actuator 30 and/or second actuator 32. The hydraulic communication from servo valve 50 to first and/or second actuators 30 and 32 engages displacement mechanism 22 of first and/or second actuators 30 and 32 to alter the displacement of first and/or second pumps 14 and 16.

Electronic engine controller 90 sends an electrical current to motor 68 of servo valve 50. In response to a current within a first current range motor 68 positions chamber 62 of spool 60 within first position range 64 of sleeve 52. In first position range 64, chamber 62 of spool 60 fluidically connects inlet port 54, first hydraulic pressure line 74, and fuel line 12 to first outlet port 56 and first actuator 30. Fluid from fuel line 12 flows through first hydraulic pressure line 74, inlet port 54, chamber 62, and first outlet port 56, and fills piston cylinder 38 of first actuator 30. As fluid chamber 36 fills, piston cylinder 38 and piston rod 42 of first actuator 30 move to engage displacement mechanism 22 of first pump 14 to alter a displacement of first pump 14. Second pump 16 is unaffected and remains steady or idle.

In response to a current within a second current range, motor 68 positions spool 60 so that chamber 62 extends within second position range 66 of sleeve 52. In second position range 66, chamber 62 of spool 60 fluidically connects inlet port 54, first hydraulic pressure line 74, and fuel line 12 to first outlet port 56 and first actuator 30 and to second outlet port 58 and second actuator 32. While in second position range 66, first outlet port 56 is mostly open or completely open such that first actuator 30 is at or near full extension of piston rod 42, and displacement mechanism 22 of first pump 14 is at or near maximum displacement. First pump 14 is at or near maximum flow rate when displacement mechanism 22 of first pump 14 is at or near maximum displacement. Simultaneously, fuel from fuel line 12 flows through first hydraulic pressure line 74, inlet port 54, chamber 62, and second outlet port 58, and fills piston cylinder 38 of second actuator 32. As fuel fills fluid chamber 36 of second actuator 32, piston cylinder 38 and piston rod 42 of second actuator 32 move to engage displacement mechanism 22 of second pump 16, which alters a displacement of second pump 16.

A current threshold between the first current range and the second current range can be altered to accommodate systems of various configurations. In one example, first pump 14 and second pump 16 can be the same size. The first current range can be from zero percent to about 49 percent of full current applied by electronic engine controller 90. The second current range can be from about 49 percent to 100 percent of full current applied by electronic engine controller 90. Therefore, in this example, the current threshold can be at some point just before 50 percent of full current so that servo valve 50 starts to engage second pump 16 before first pump 14 has reached a maximum displacement. As servo valve 50 engages second pump 16, servo valve 50 maintains maximum displacement of first pump 14. In another example, first pump 14 can be twice as large as second pump 16. In this example, the current threshold can be at some point just before 66 percent current where servo valve 50 starts to engage second pump 16 before first pump 14 has reached a maximum displacement. As servo valve 50 engages second pump 16, servo valve 50 maintains maximum displacement of first pump 14. In another example, first pump 14 can be half the size of second pump 16. In this example, the current threshold can be at some point just before 33 percent current where servo valve 50 starts to engage second pump 16 before first pump 14 is maxed out. As servo valve 50 engages second pump 16, servo valve 50 maintains maximum displacement of first pump 14. In other examples, the current threshold can be adjusted to a different value than the values provided in the above-described examples.

Discussion of Possible Embodiments

The following are non-exclusive descriptions of possible embodiments of the present invention.

A pumping system includes a first variable displacement pump having a first inlet and a first outlet. The first outlet is fluidically connected to a system outlet. A first actuator is mechanically coupled to a first displacement mechanism of the first variable displacement pump. A second variable displacement pump includes a second inlet and a second outlet. The second outlet is fluidically connected to the system outlet. The pumping system also includes a second actuator mechanically coupled to a second displacement mechanism of the second variable displacement pump. An electrohydraulic servo valve is hydraulically connected to the first and second actuators. An electronic engine controller is in communication with the electrohydraulic servo valve and is configured to send electrical current to the electrohydraulic servo valve to drive the first actuator and the second actuator.

The pumping system of the preceding paragraph can optionally include, additionally and/or alternatively, any one or more of the following features, configurations and/or additional components:

the first actuator is a piston assembly comprising: a housing; a fluid chamber contained within the housing; a piston cylinder inside the housing; a spring chamber inside the housing opposite the fluid chamber relative to the piston cylinder; a piston rod attached to the piston cylinder; and a spring compressed in the spring chamber;

the piston rod is connected to the first displacement mechanism of the first variable displacement pump;

the second actuator is a piston assembly comprising: a second housing; a second fluid chamber contained within the second housing; a second piston cylinder inside the second housing; a second spring chamber inside the second housing opposite the second fluid chamber relative to the second piston cylinder; a second piston rod attached to the second piston cylinder; and a second spring compressed in the second spring chamber;

the second piston rod is connected to the second displacement mechanism;

the first actuator comprises a linear variable differential transducer in communication with the electronic engine controller and configured to measure a linear displacement of the first actuator, and wherein the second actuator comprises a second linear variable differential transducer in communication with the electronic engine controller and configured to measure a linear displacement of the second actuator;

the electrohydraulic servo valve comprises: a sleeve extending axially along a center axis; an inlet port formed on the sleeve; a first outlet port formed on the sleeve and hydraulically connected to the first actuator; a second outlet port formed on the sleeve and hydraulically connected to the second actuator, wherein the second outlet port is staggered with the first outlet port such that an axial position of the first outlet port overlaps an axial position of the second outlet port relative the center axis of the sleeve; and a spool inside the sleeve, wherein the spool comprises: a chamber formed on the spool; a first position range within the sleeve within which the second outlet port is closed and the first outlet port is at least partially open to the chamber and the inlet port; and a second position range within the sleeve within which the second outlet port is at least partially open to the chamber and the inlet port, and wherein a majority of the first outlet port is open to the chamber and the inlet port;

the electrohydraulic servo valve further comprises: a motor connected to the spool, wherein the motor is configured to position the spool within the first position range when a first current range is applied to the motor, and wherein the motor is configured to position the spool within the second position range when a second current range is applied to the motor;

further comprising: a first check valve downstream from the first outlet of the first variable displacement pump, wherein the first check valve prevents backflow into the first variable displacement pump; a second check valve downstream from the second outlet of the second variable displacement pump, wherein the second check valve prevents backflow into the second variable displacement pump; a first hydraulic pressure line comprising a first end and a second end, wherein the first end is fluidically connected to the electrohydraulic servo valve, and wherein the second end is fluidically connected between the system outlet and the first and second check valves; and a second hydraulic pressure line fluidically connecting the electrohydraulic servo valve to a fluid supply; and/or the system outlet comprises a fuel nozzle.

A fuel delivery system includes a fuel line connected to a fuel nozzle. A first pump assembly has a first pump with a first outlet fluidically connected to the fuel line. A first hydraulic actuator is mechanically coupled to the first pump, and a first linear variable differential transducer is attached to the first hydraulic actuator. A first check valve is downstream from the first pump. The first check valve prevents backflow into the first pumping assembly. A second pump assembly includes a second pump with a second outlet fluidically connected to the fuel line. A second hydraulic actuator is mechanically coupled to the second pump, and a second linear variable differential transducer is attached to the second hydraulic actuator. A second check valve is downstream from the second pump. The second check valve prevents backflow into the second pumping assembly. The fuel delivery system also includes an electrohydraulic servo valve hydraulically connected to the first and second hydraulic actuators. An electronic engine controller is in communication with the first linear variable differential transducer, the second linear variable differential transducer, and the electrohydraulic servo valve.

The fuel delivery system of the preceding paragraph can optionally include, additionally and/or alternatively, any one or more of the following features, configurations and/or additional components:

the first pump is a variable displacement pump comprising a first swashplate mechanically coupled to the first hydraulic actuator, and wherein the second pump is a variable displacement pump comprising a second swashplate mechanically coupled to the second hydraulic actuator;

the electrohydraulic servo valve further comprises: a sleeve; an inlet port formed on the sleeve; a first outlet port formed on the sleeve and hydraulically connected to the first actuator; a second outlet port formed on the sleeve and hydraulically connected to the second actuator, wherein the second outlet port is staggered with the first outlet port such that an axial position of the first outlet port overlaps an axial position of the second outlet port relative a center axis of the sleeve; and a spool inside the sleeve, wherein the spool comprises: a chamber formed on the spool; a first position range within the sleeve within which the second outlet port is closed and the first outlet port is at least partially open to the chamber and the inlet port; and a second position range within the sleeve within which the second outlet port is at least partially open to the chamber and the inlet port, and wherein a majority of the first inlet port is open to the chamber and the inlet port;

the electrohydraulic servo valve further comprises: a motor connected to the spool, wherein the motor is configured to position the spool within the first position range when a first current range is applied to the motor, and wherein the motor is configured to position the spool within the second position range when a second current range is applied to the motor; and/or further comprising: a first hydraulic pressure line comprising a first end and a second end, wherein the first end is fluidically connected to the electrohydraulic servo valve, and wherein the second end is fluidically connected between the system outlet and the first and second check valves; and a second hydraulic pressure line fluidically connecting the electrohydraulic servo valve to a fluid supply.

A method of controlling a pumping system includes sensing by a first position sensor a linear displacement of a first actuator that is mechanically coupled to a displacement mechanism of a first variable displacement pump. A second position sensor senses a second linear displacement of a second actuator that is mechanically coupled to a second displacement mechanism of a second variable displacement pump. The method also includes receiving the linear displacement of the first actuator and the second linear displacement of the second actuator by an electronic engine controller. The electronic engine controller sends a current to a servo valve. The servo valve is hydraulically connected to the first actuator and the second actuator. The servo valve communicates hydraulically with at least one of the first and second actuators in response to the current sent to the servo valve.

The method of the preceding paragraph can optionally include, additionally and/or alternatively, any one or more of the following features, configurations and/or additional components:

communicating hydraulically by the servo valve to the first actuator when the current is below a predetermined threshold, wherein the servo valve does not hydraulically communicate with the second actuator when the current is below the predetermined threshold; and communicating hydraulically by the servo valve to the first actuator and the second actuator when the current is above the predetermined threshold;

engaging a first swashplate of the first variable displacement pump to alter a displacement of the first variable displacement pump with a first piston rod of the first actuator when the current is below the predetermined threshold and the servo valve hydraulically communicates with the first actuator; and engaging a second swashplate of the second variable displacement pump to alter a displacement of the second variable displacement pump with a second piston rod of the second actuator when the current is above the predetermined threshold and the servo valve hydraulically communicates with the second actuator;

engaging the first swashplate of the first variable displacement pump to alter the displacement or maintain a maximum displacement of the first variable displacement pump with the piston rod of the first actuator when the current is above the predetermined threshold; and/or the first variable displacement pump and the second variable displacement pumps are not the same size.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. For example, as discussed above, pumping system 10 includes two pumps (first and second pump (14 and 16)) and one current threshold. In another example, pumping system 10 could include three pumps with two current thresholds. In yet another example, system 10 can include multiple pumps with multiple current thresholds. Therefore, it is intended that the invention not be limited to the particular embodiment(s) disclosed, but that the invention will include all embodiments falling within the scope of the appended claims.

The invention claimed is:

1. A pumping system for supplying fuel to a jet turbine engine, the pumping system comprising:
    a first variable displacement pump comprising a first inlet and a first outlet, wherein the first outlet is fluidically connected to a system outlet;
    a first actuator mechanically coupled to a first displacement mechanism of the first variable displacement pump;
    a second variable displacement pump comprising a second inlet and a second outlet, wherein the second outlet is fluidically connected to the system outlet;
    a second actuator mechanically coupled to a second displacement mechanism of the second variable displacement pump;
    an electrohydraulic servo valve hydraulically connected to the first and second actuators; and
    an electronic engine controller in communication with the electrohydraulic servo valve and configured to send electrical current to the electrohydraulic servo valve to drive the first actuator and the second actuator,
    wherein the first actuator comprises a linear variable differential transducer in communication with the electronic engine controller and configured to measure a linear displacement of the first actuator, and wherein the second actuator comprises a second linear variable differential transducer in communication with the electronic engine controller and configured to measure a linear displacement of the second actuator.

2. The pumping system of claim 1, wherein the first actuator is a piston assembly comprising:
    a housing;
    a fluid chamber contained within the housing;
    a piston cylinder inside the housing;
    a spring chamber inside the housing opposite the fluid chamber relative to the piston cylinder;
    a piston rod attached to the piston cylinder; and
    a spring compressed in the spring chamber.

3. The pumping system of claim 2, wherein the piston rod is connected to the first displacement mechanism of the first variable displacement pump.

4. The pumping system of claim 3, wherein the second actuator is a piston assembly comprising:
    a second housing;
    a second fluid chamber contained within the second housing;
    a second piston cylinder inside the second housing;
    a second spring chamber inside the second housing opposite the second fluid chamber relative to the second piston cylinder;
    a second piston rod attached to the second piston cylinder; and
    a second spring compressed in the second spring chamber.

5. The pumping system of claim 4, wherein the second piston rod is connected to the second displacement mechanism.

6. The pumping system of claim 1, wherein the electrohydraulic servo valve comprises:
    a sleeve extending axially along a center axis;
    an inlet port formed on the sleeve;
    a first outlet port formed on the sleeve and hydraulically connected to the first actuator;
    a second outlet port formed on the sleeve and hydraulically connected to the second actuator, wherein the second outlet port is staggered with the first outlet port such that an axial position of the first outlet port overlaps an axial position of the second outlet port relative to the center axis of the sleeve; and
    a spool inside the sleeve, wherein the spool comprises:
        a chamber formed on the spool;
        a first position range within the sleeve within which the second outlet port is closed and the first outlet port is at least partially open to the chamber and the inlet port; and
        a second position range within the sleeve within which the second outlet port is at least partially open to the chamber and the inlet port, and wherein a majority of the first outlet port is open to the chamber and the inlet port.

7. The pumping system of claim 6, wherein the electrohydraulic servo valve further comprises:
    a motor connected to the spool,
    wherein the motor is configured to position the spool within the first position range when a first current range is applied to the motor, and
    wherein the motor is configured to position the spool within the second position range when a second current range is applied to the motor.

8. The pumping system of claim 7, further comprising:
    a first check valve downstream from the first outlet of the first variable displacement pump, wherein the first check valve prevents backflow into the first variable displacement pump;
    a second check valve downstream from the second outlet of the second variable displacement pump, wherein the second check valve prevents backflow into the second variable displacement pump;
    a first hydraulic pressure line comprising a first end and a second end, wherein the first end is fluidically connected to the electrohydraulic servo valve, and wherein the second end is fluidically connected between the system outlet and the first and second check valves; and
    a second hydraulic pressure line fluidically connecting the electrohydraulic servo valve to a fluid supply.

9. The pumping system of claim 8, wherein the system outlet comprises a fuel nozzle.

10. A fuel delivery system for supplying fuel to a jet turbine engine, the fuel delivery system comprising:
    a fuel line connected to a fuel nozzle;
    a first pump assembly comprising:
        a first pump with a first outlet fluidically connected to the fuel line;
        a first hydraulic actuator mechanically coupled to the first pump;
        a first linear variable differential transducer attached to the first hydraulic actuator; and a first check valve downstream from the first pump, wherein the first check valve prevents backflow into the first pumping assembly;

a second pump assembly comprising:
  a second pump with a second outlet fluidically connected to the fuel line;
  a second hydraulic actuator mechanically coupled to the second pump;
  a second linear variable differential transducer attached to the second hydraulic actuator; and
  a second check valve downstream from the second pump, wherein the second check valve prevents backflow into the second pumping assembly;

an electrohydraulic servo valve hydraulically connected to the first and second hydraulic actuators; and an electronic engine controller in communication with the first linear variable differential transducer, the second linear variable differential transducer, and the electrohydraulic servo valve.

11. The pumping system of claim 10, wherein the first pump is a variable displacement pump comprising a first swashplate mechanically coupled to the first hydraulic actuator, and wherein the second pump is a variable displacement pump comprising a second swashplate mechanically coupled to the second hydraulic actuator.

12. The pumping system of claim 11, wherein the electrohydraulic servo valve further comprises:
  a sleeve;
  an inlet port formed on the sleeve;
  a first outlet port formed on the sleeve and hydraulically connected to the first actuator;
  a second outlet port formed on the sleeve and hydraulically connected to the second actuator, wherein the second outlet port is staggered with the first outlet port such that an axial position of the first outlet port overlaps an axial position of the second outlet port relative to a center axis of the sleeve; and
  a spool inside the sleeve, wherein the spool comprises:
    a chamber formed on the spool;
    a first position range within the sleeve within which the second outlet port is closed and the first outlet port is at least partially open to the chamber and the inlet port; and
    a second position range within the sleeve within which the second outlet port is at least partially open to the chamber and the inlet port, and wherein a majority of the first outlet port is open to the chamber and the inlet port.

13. The pumping system of claim 12, wherein the electrohydraulic servo valve further comprises:
  a motor connected to the spool,
  wherein the motor is configured to position the spool within the first position range when a first current range is applied to the motor, and
  wherein the motor is configured to position the spool within the second position range when a second current range is applied to the motor.

14. The pumping system of claim 13, further comprising:
a first hydraulic pressure line comprising a first end and a second end, wherein the first end is fluidically connected to the electrohydraulic servo valve, and wherein the second end is fluidically connected between the system outlet and the first and second check valves; and a second hydraulic pressure line fluidically connecting the electrohydraulic servo valve to a fluid supply.

15. A method of controlling a pumping system for supplying fuel to a jet turbine engine, the method comprising:
  sensing by a first position sensor a linear displacement of a first actuator that is mechanically coupled to a displacement mechanism of a first variable displacement pump;
  sensing by a second position sensor a second linear displacement of a second actuator that is mechanically coupled to a second displacement mechanism of a second variable displacement pump;
  receiving the linear displacement of the first actuator and the second linear displacement of the second actuator by an electronic engine controller;
  sending a current from the electronic engine controller to a servo valve, wherein the servo valve is hydraulically connected to the first actuator and the second actuator; and
  communicating hydraulically by the servo valve with at least one of the first and second actuators in response to the current sent to the servo valve,
  wherein the first actuator comprises a linear variable differential transducer in communication with the electronic engine controller and configured to measure the linear displacement of the first actuator, and wherein the second actuator comprises a second linear variable differential transducer in communication with the electronic engine controller and configured to measure the linear displacement of the second actuator.

16. The method of claim 15, further comprising:
communicating hydraulically by the servo valve to the first actuator when the current is below a predetermined threshold, wherein the servo valve does not hydraulically communicate with the second actuator when the current is below the predetermined threshold; and
communicating hydraulically by the servo valve to the first actuator and the second actuator when the current is above the predetermined threshold.

17. The method of claim 16, further comprising:
engaging a first swashplate of the first variable displacement pump to alter a displacement of the first variable displacement pump with a first piston rod of the first actuator when the current is below the predetermined threshold and the servo valve hydraulically communicates with the first actuator; and
engaging a second swashplate of the second variable displacement pump to alter a displacement of the second variable displacement pump with a second piston rod of the second actuator when the current is above the predetermined threshold and the servo valve hydraulically communicates with the second actuator.

18. The method of claim 17, further comprising:
engaging the first swashplate of the first variable displacement pump to alter the displacement or maintain a maximum displacement of the first variable displacement pump with the piston rod of the first actuator when the current is above the predetermined threshold.

19. The method of claim 18, wherein the first variable displacement pump and the second variable displacement pumps are not the same size.

* * * * *